MODE CONTROL CIRCUIT

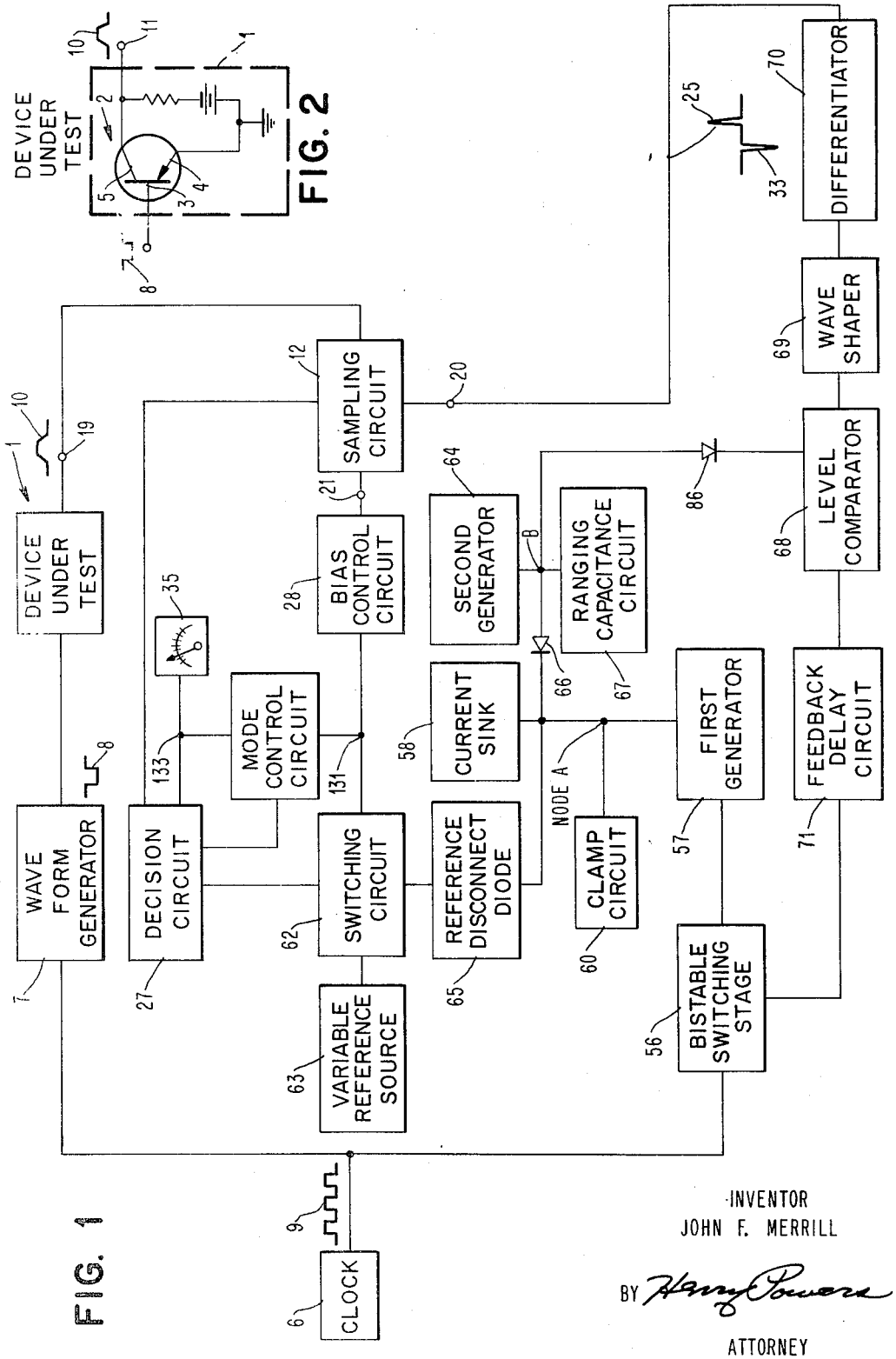

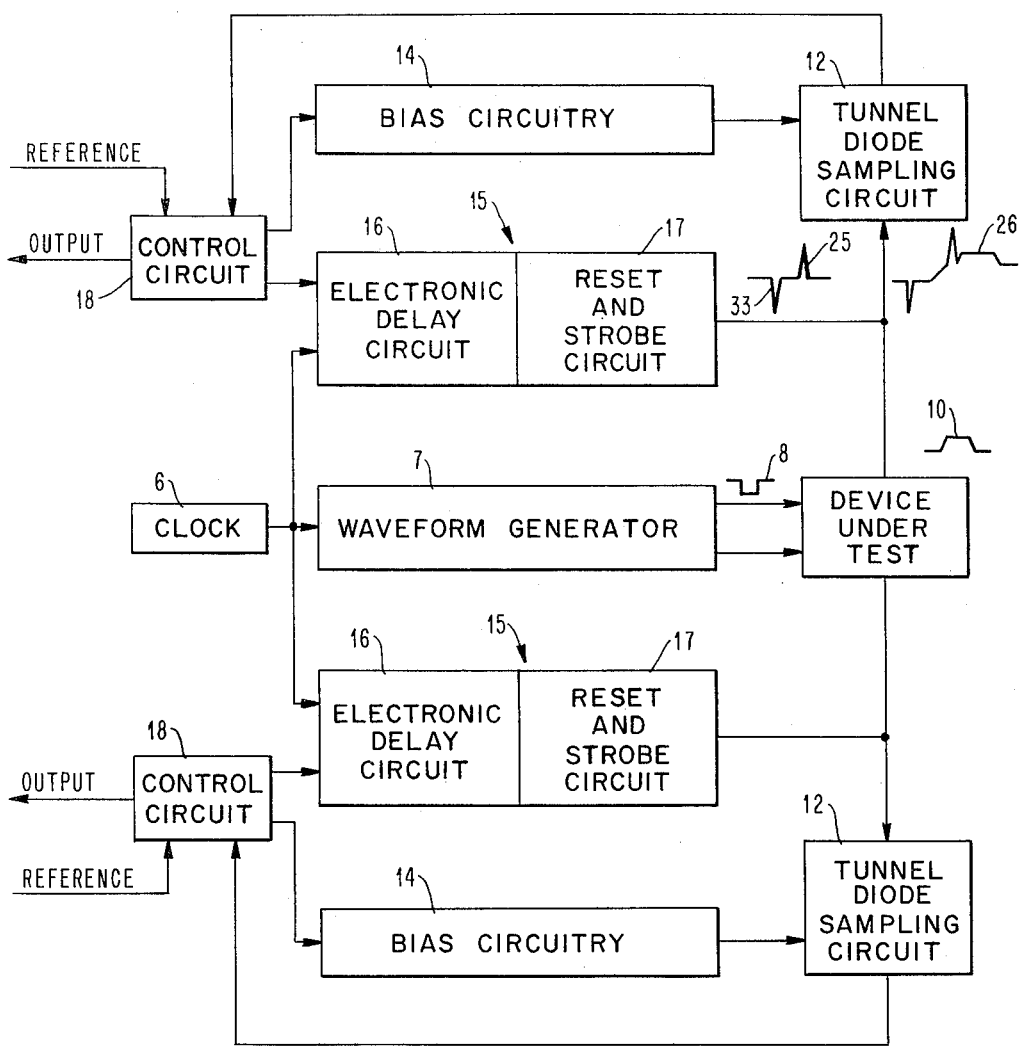

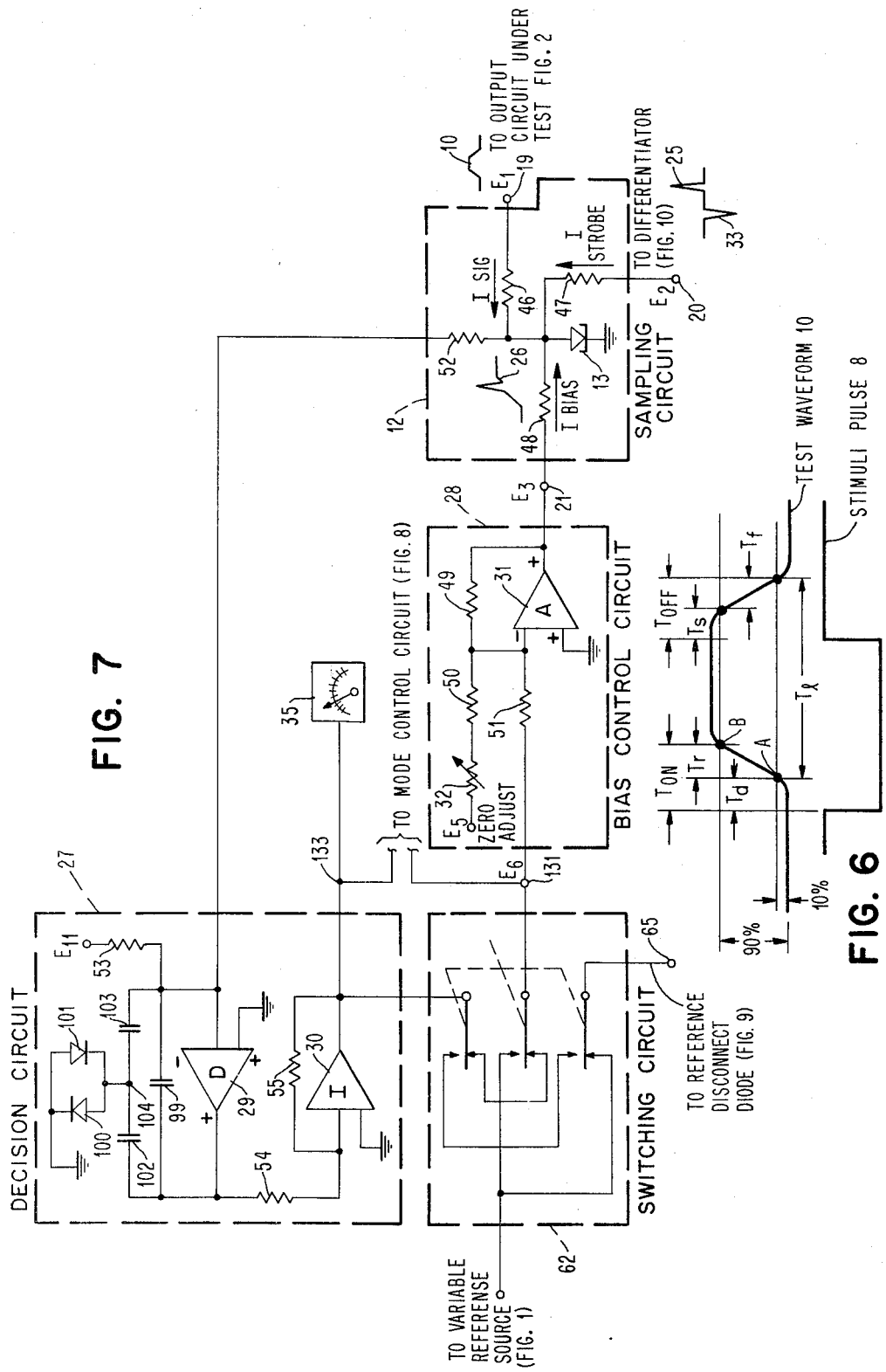

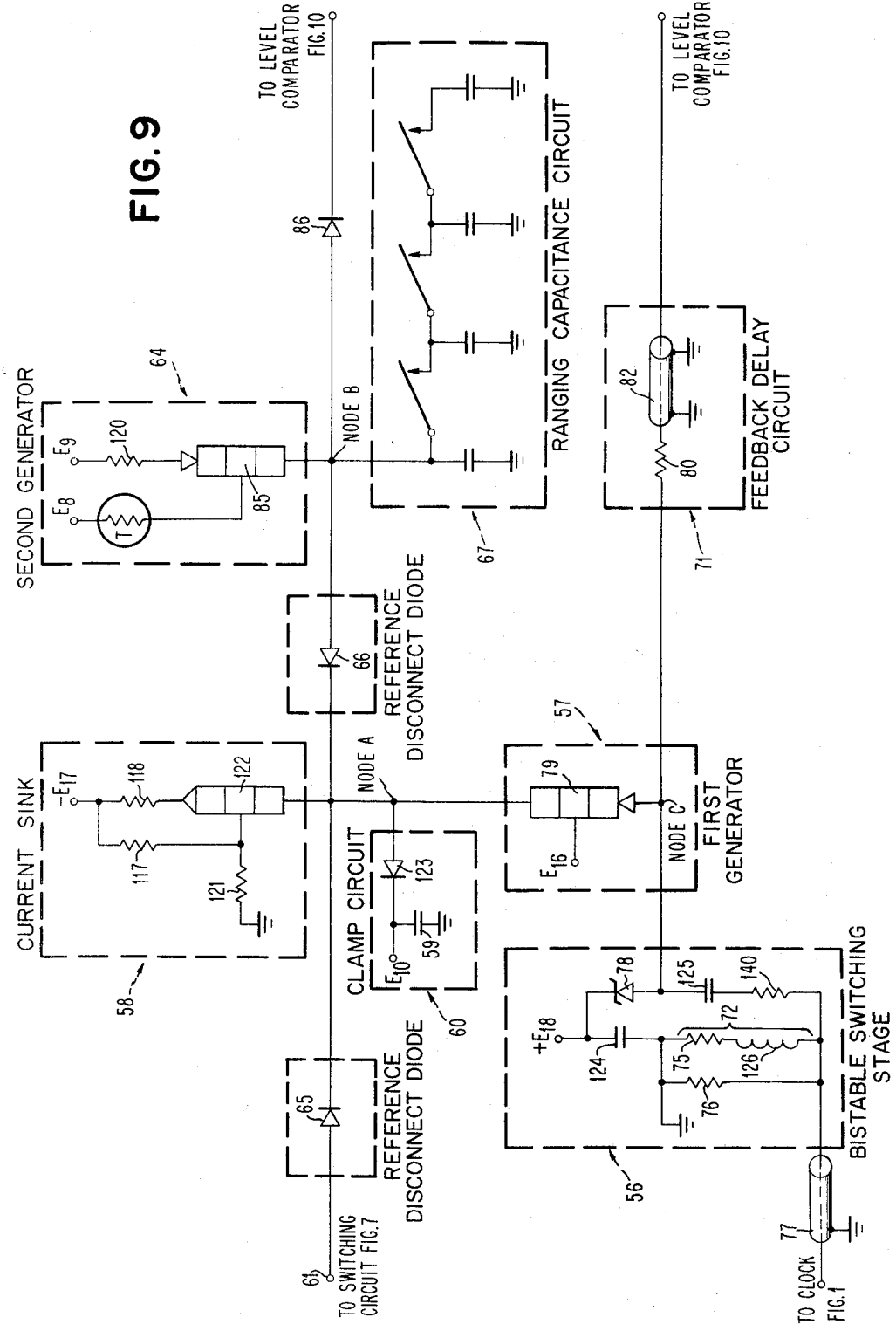

April 7, 1970  J. F. MERRILL  3,505,598
PULSE MEASURING SYSTEM
Filed Aug. 28, 1967  8 Sheets-Sheet 7

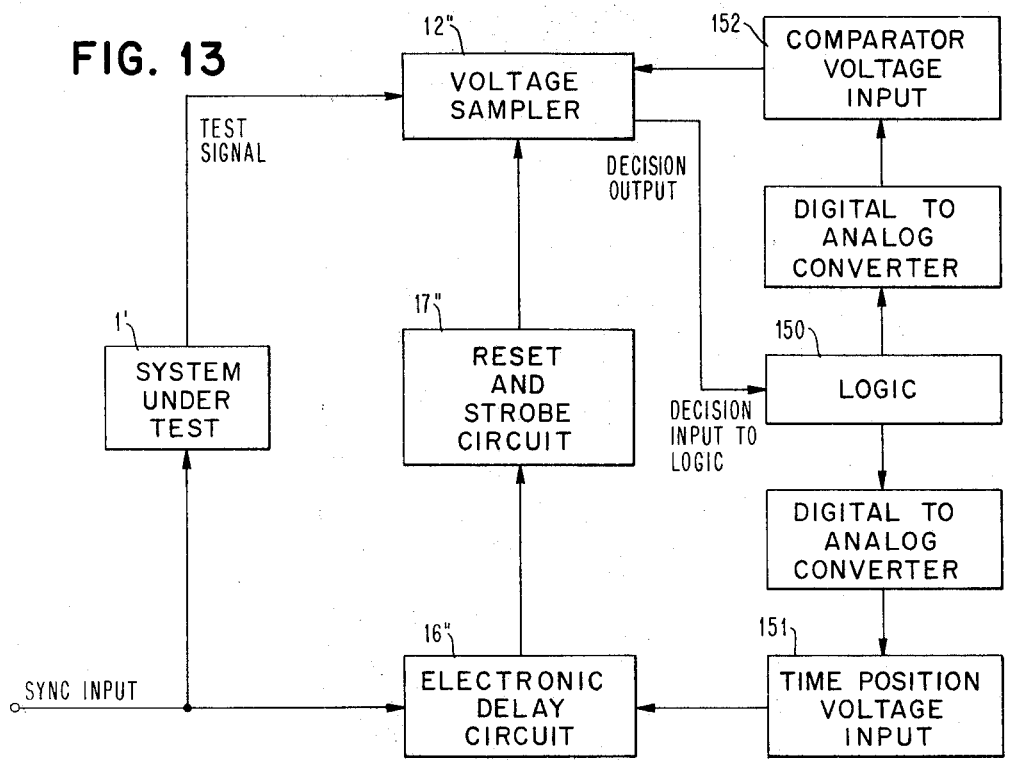
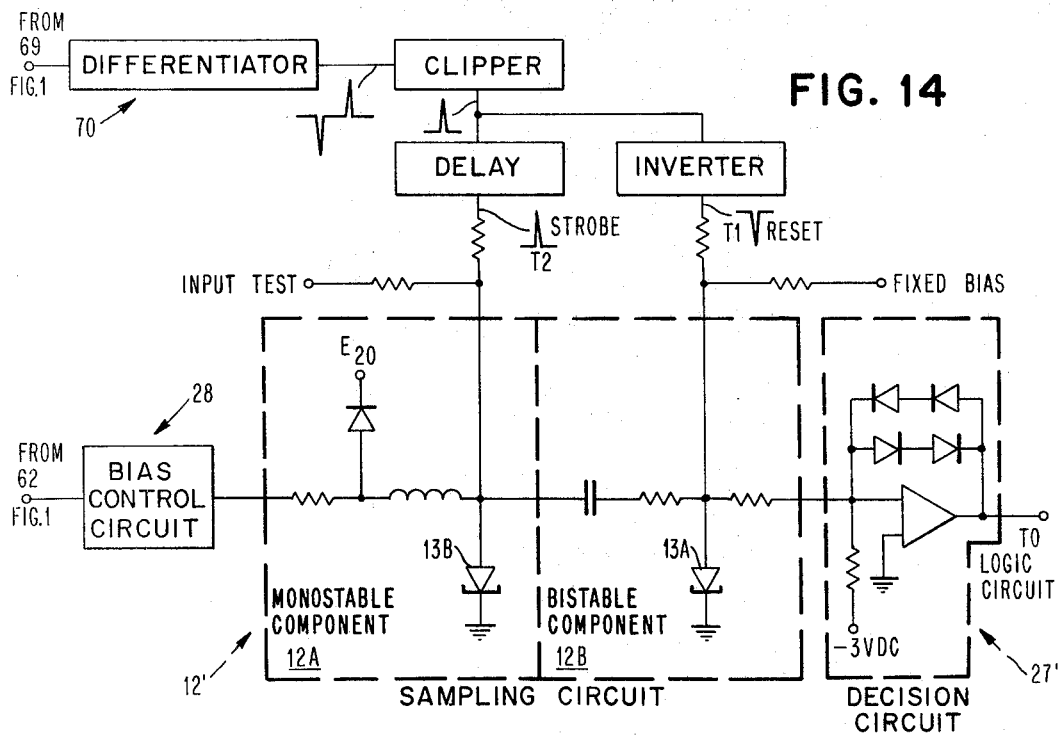

United States Patent Office 3,505,598
Patented Apr. 7, 1970

3,505,598
PULSE MEASURING SYSTEM
John F. Merrill, Wappingers Falls, N.Y., assignor to International Business Machines Corporation, Armonk, N.Y., a corporation of New York
Filed Aug. 28, 1967, Ser. No. 663,710
Int. Cl. G04f 11/00; G01r 19/04
U.S. Cl. 324—77     12 Claims

ABSTRACT OF THE DISCLOSURE

An electrical circuit for measuring (a) the voltage level of a waveform at a specific time with respect to a reference point in time (e.g. clock or sync pulse) and (b) the time required with respect to a reference time for a waveform to reach a specific voltage level. In the first case, the voltage at a given sample time is measured, while in the second case, the time to a given voltage is measured.

Both embodiments employ a slide-back sensing circuit in which a test signal, in conjunction with a superimposed controllably variable strobe pulse, is applied to a tunnel diode along with a DC bias signal whose magnitude is controlled through a feedback loop until the bias plus the test and strobe signals equals the threshold level of the tunnel diode, at which time the bias level becomes a measurement of the input signal. The tunnel diode is reset prior to the superimpositioning of the strobe pulse on the input signal.

FIELD OF THE INVENTION

This invention relates to an electrical measuring apparatus for determining transient or dynamic characteristics of electrical systems, e.g. integrated logic devices, transistors and the like, where the times of delay, rise, turn-on, storage and turn-off times within which the system responds are significantly important. Accordingly, the invention is more particularly related to a system for waveform analysis including the measurement of rise time, pulse length, pulse height, and other parameters of the time response of electrical devices and systems to a control signal.

DESCRIPTION OF THE PRIOR ART

The rate of change of a waveform with respect to time is a variable quantity. Generally, time intervals on high frequency signal or extremely fast pulses, such as obtained from components such as transistors, diodes, tunnel diodes, high frequency cables, pulse transformers, delay lines, amplifiers and related high-speed switching devices, are of such short duration that it is extremely difficult to measure those time intervals which extend into the nanosecond range.

Heretofore, one method of making high speed switching measurements has been to display on a sampling oscilloscope screen the switching waveforms on which the transient or dynamic characteristics are to be measured, and actually observing the pulse envelope to visually observe and physically measuring the rise time, pulse length and fall time of the waveform.

In another method, the initial steady state level and final steady state level of the pulses were first ascertained, and calculations made to determine the actual voltage levels equal to the levels on the signal between which the time interval is desired to be measured. For example, the 10% and 90% points of the voltage difference between the initial and final steady state levels generally represent rise-time. These 10% and 90% voltage levels are employed as fixed test limit amplitude signals which can then be fed into two discriminators, the first of which triggers the generation of a ramp voltage that rises linearly with time, and the second of which stops the voltage rise. The amount of voltage rise represents an output proportional to the desired time interval measurement.

In another method, a pulse sampling technique is employed in which a strobe sampling pulse is continuously shifted across recurring test waveform by means of a control voltage, the magnitude of which controls the delay in the occurrence of the strobe pulse. The magnitude of the voltage is obtained from a controllable voltage generator by which the magnitude of the voltage generator output can be equated with "time" so that a particular voltage level represents a particular instant of time in the cycle of recurring signals. In this method, it is first necessary to establish the desired voltage levels of interest (i.e. 10% and 90% voltage levels of a waveform) as reference potentials which are stored and applied as static limits to a comparator circuit for comparison with the dynamic voltage levels of the strobed waveform in point. A comparator circuit is then employed which triggers at the instant the train of the sampling pulses crosses the level of the stored reference potentials. Triggering of the comparator circuits as the strobed sampling pulses cross, respectively, 10% and 90% reference levels, is correlated with the magnitude of voltage generator output which represents the position of the strobe pulse so as to fix the instants in time of the occurrence of coincidence of the strobed sampled pulse with the stored 10% and 90% reference levels. Although this system provides an improved method of time measurements, it is susceptible to false reading in the event of the occurrence of transients and noise pulses, in the device under test, in view of the resultant comparison of the dynamic output with stored values.

Thus prior methods, heretofore, have involved the use of oscilloscopes and actually observing the pulse envelope to observe rise time, pulse length and fall time, and/or the use of storage devices. As has been noted such systems and methods have inherent limitations and disadvantages. Accordingly, it is desireable that a system be provided which is able to measure waveform properties in real time with minimization of transient and noise pulses.

SUMMARY OF THE INVENTION

In accordance with this invention, a system is provided for measuring the real time dynamic response of various electronic circuits, components, devices and the like. In general, the real time measurements of such a test pulse or output waveform is obtained by superimposing a strobe pulse as a sampling signal at controllably selected points along the test pulse or output waveform, with the resultant composite or control pulse employed to control a tunnel diode voltage sampling circuit to provide an output signal proportional to the magnitude of the test signal or waveform coincident with the strobe or sampling pulse, or an output signal proportional to the time required with respect to a reference time for the test pulse to rise to a desired level.

For voltage level measurements, location of the strobe pulse at selected points of the waveform, under test, is obtained by imparting a controlled delay to the strobe pulse by means of a control or reference voltage whose magnitude controls a corresponding proportional delay in the occurrence of the strobe pulse. Thus a particular reference voltage represents a particular instant in time of sampling with respect to a reference time which may be represented by means of conventional clock or sync pulses.

The composite signal is applied to the input of the tunnel diode sampling circuit along with a D.C. bias whose magnitude is controlled through a feedback loop until the bias plus the peak of the composite signal (i.e.

test signal and strobe) equals the threshold level of the tunnel diode, at which time the bias level becomes a measurement of the magnitude of the input signal along the waveform coincident with the strobe pulse. The sampling circuit is a strobed modification and improvement of the conventional slide-back sensing circuits such as described by T. P. Sylvan in pages 60 to 64 of the EEE publication of September 1963, and hereinafter referred to as a "slide-back sensing circuit." In accordance with this invention the slide-back sensing circuit is employed as a strobed tunnel diode discriminator which makes a decision about the test signal amplitude at the time of each strobe occurrence. In operation the tunnel diode is biased to a level which will fire when the peak of the composite or control signal arrives. The strobe portion of the composite signal is made large in magnitude in comparison to the test signal itself, and both the strobe and test signals are required, for this invention, to fire the tunnel diode. The effect is to make the peak level of the input signal at the point where the strobe occurs. In operation the tunnel diode discriminator circuit includes an output feedback loop to the tunnel diode whereby the tunnel diode is back-biased with a voltage proportional to the output voltage level of the discriminator. As a result the tunnel diode will switch only when the peak amplitude of the composite signal exceeds the level of the bias operationally established by the bias applied through the feedback loop. Thus with the amplitude of the strobe known, the level of the signal can be determined. In this manner the level of an input signal at any particular time can be detected rather than the peak.

In the time measurement system, the feedback of the tunnel diode discriminator is not brought back to the DC bias of the tunnel diode, but is, instead, used to drive a delay circuit which transforms the output voltage into a time delay proportional to that voltage; which thus changes the time position of the strobe (relative to the test signal) such that the tunnel diode will be ready to fire at a different time position of the test signal. The bias now, instead of coming from the feedback circuit, is selected from a controllable source of reference voltages or a voltage generator. This controlled reference voltage source is employed to adjust the bias on the tunnel diode to the desired amplitude of the test signal. Thus, the strobe will slowly sweep along the test signal until the input signal coincident with the superimposed strobe reaches a level proportional to the DC bias adjusted across the tunnel diode. The amount of time swept by the strobe is proportional to the change in voltage at the output of such a herein modified "slide-back sensing circuit." If desired, this output voltage may be measured and calibrated to give an analog voltage indication of the time delay between an input event such as a clock or sync pulse and the time the test signal crosses the desired amplitude as set by the controllable reference source.

Accordingly, it is an object of this invention to provide a circuit for measuring the transient and dynamic characteristics of an electronic or electrical system such as circuits, components, devices and the like.

Another object of the invention is to provide a circuit to measure response time of electrical or electronic systems.

Still another object of the invention is to provide a pulse time measuring system which will automatically measure pulse parameters in real time.

A further object of the invention is to provide a pulse time measuring system which produces a real time output voltage proportional to the amplitude of a waveform, at any selected points thereon.

A still further object is to provide a real time pulse measuring system to measure the time required for a waveform to reach a specific voltage level from a reference point in time.

It is also an object of this invention to provide means for measuring the time interval within which a signal rises or falls from one level to another.

The foregoing and other objects, features and advantages of the invention will be apparent from the following more particular description of the preferred embodiments of the invention, as illustrated in the accompanying drawings.

BRIEF DESCRIPTION OF THE DRAWINGS

In the drawings:

FIGURE 1 is a schematic diagram showing the preferred operating form of the invention;

FIGURE 2 is a simplified drawing of a transistor circuit to be tested as representative of the devices contemplated by the invention;

FIGURE 3 is a simplified block diagram showing the adaptation of the invention to a two channel system;

FIGURE 6 is a schmetic representation of the input signal applied to a device under test and its representative output waveform's response of the device;

FIGURES 7, 9, 10 and 11 are circuit diagrams illustrating specific circuits implementing the system shown in block form on FIGURE 1;

FIGURE 13 is a block diagram of a modification of the circuits shown in FIGURES 4 and 5; and FIGURE 14 shows detailed alterations of the circuit portion shown in FIGURE 7 for adaption to the modification of FIGURE 13,

DESCRIPTION OF THE PREFERRED EMBODIMENTS

Figure 4:
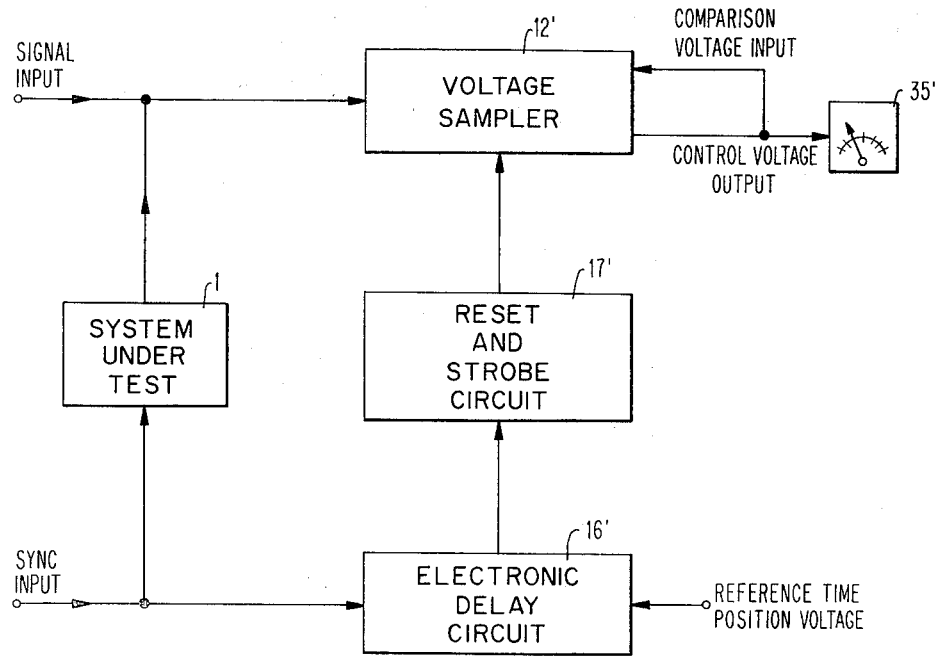
FIGURE 4 is a simplified block diagram showing a specific modification of the invention as a voltage measuring system.

Referring to the drawings, the "Device Under Test" 1 shown in FIGURE 1 is assumed, for purposes of simplicity, to be a transistor 2 as indicated in FIGURE 2, appropriately biased and having the usual base terminal 3, the emitter 4 and the collector 5. However, as will be apparent and indicated above, the transistor 2 employed is only illustrative of the devices whose response characteristic can be measured by the invention, and which include tubes, diodes, tunnel diodes, pulse transformers, various electronic circuits including logic circuit delay lines, amplifiers and the like.

In operations, a sync or clock pulse generator 6 produces a series of pulses 9 which are simultaneously applied to an electronic delay circuit 16 (FIGURES 3, 4 and 5) with the electronic delay circuit in FIGURE 1 described in detail in the last paragraph beginning in Column 9 and to a waveform generator 7 to provide a series output pulses 8 for activating the device under test such as the indicated transistor 2. These output pulses 8 are correlated to the sync pulse which form corresponding reference pulses for the device whose response characteristics are to be measured. The application of the stimulus pulse 8 to component 2 causes current to flow therethrough with the concurrent generation of an output waveform 10 at the collector 5, and shown at its terminal 11 in FIGURE 2. The time for the ouput waveform 10 to go from the initial steady state level to its final steady state level is finite, as is the time interval between the stimulus of the component, by pulses 8, and its output response which produces waveform 10. As will be understood, although the stimuli pulse 8 has been shown to be negative going and the waveform 10 as positive going such representation is merely illustrative, and either one of the stimuli pulse 8 and waveform 10 may be positive-going or negative going waveforms.

In view of the necessity for ascertaining the response characteristics of a component for various applications, it is conventional practice to assign arbitrary limits at the 10% (A in FIGURE 6) level on a waveform along its way e.g. ramp, from one steady state level to a second steady state level. Thus the "rise-time" $T_r$ or "fall-time" $T_f$ is the time it takes a signal to change from 10% to 90% of its final steady state level. With reference of the specific configuration of the stimuli pulse 8 and the test waveform 10 shown in FIGURE 6, the turn-on delay or delay time $T_d$ is represented by time interval between the leading edge of the stimuli pulse 8 applied to the transistor base 3 and then the rise to 10% point along the ramp of the response waveform 10 of the collector 5 at its terminal 11 (FIGURE 2).

Turn-on time $T_{on}$ is represented by the difference in response between the time of occurrence of the leading edge of the stimuli pulse 8 applied to the base 3 of transistor 2 and the 90% point of the output waveform 10 response at the collector 5. Thus, in sum, the response time $T_r$ is the difference between the turn-on time $T_{on}$ and the delay time $T_d$ of the component.

Also, storage time $T_s$ is represented by period between the trailing edge of the stimuli pulse 8 applied to transistor base 3 and the return to a 90% point of the output waveform response 10 at collector 5. Lastly, the turn-off time $T_{off}$ is represented by the difference in response between turn-off of the stimuli pulse 8 and the return of transistor 2 to the 10% point of the output waveform response 10 at collector 5. Thus, in sum, fall-time $T_f$ is also the difference between turn-off and storage times $T_{off}$ and $T_s$, respectively.

In reference to the foregoing considerations and to FIGURE 6, with the stimuli pulse 8 applied to base 3 of transistor 2, the response of the transistor for such pulse application reaches the 10% response level at time $T_d$, which occurs at short time following the application of the leading edge of the stimuli pulse. The time within which the transistor under test reaches the 90% response level is indicated by the time $T_r$ with the transistor very shortly thereafter producing a saturated response represented by the peak level of the output waveform 10. The stimuli pulse 8 driving transistor 2 is terminated a short time prior to that at which the response level of the transistor drops, as represented by the storage time interval $T_s$. The storage period continues to the time when the component response is reduced to its 90% level. The fall period $T_f$ follows the end of the storage period and represents the time period over which the response of the transistor, to the applied trailing edge pulse 8, is reduced to its 10% level. Finally, the pulse length $T_1$ of the output waveform 10, represents the time period or duration of the waveform between the 10% points on its leading and trailing edges. However, it is to be understood that the foregoing reference to waveform portions is only illustrative, and the invention is also comprehended for measuring voltages at the zero and one hundred percent level of a waveform.

Referring now to the drawings, FIGURES 1 and 4 and particularly to FIGURE 3 which shows a schematic block diagram of an embodiment of the invention which has been adapted for measuring the voltage levels at any desired or selected time of a signal. The system of the invention for voltage level decisions includes a strobed tunnel diode discriminator circuit which is employed as a sampling circuit 12 for making a decision about the amplitude of the output waveform 10 at the time of each stroke occurrence. In its broadest aspect, the voltage level decisions of the tunnel diode 13 (FIGURE 7) is varied by control circuitry to determine the amplitude of the output waveform 10, with the decisions of the tunnel diode controlling the direction for adjusting the decision point desired. Thus the final value to which the decision point is adjusted corresponds to the amplitude of the waveform, and thus is a voltage measurement at a specific point in time. The point in time is the position of the strobe pulse with respect to the waveform 10, or with respect to a clock or sync pulse 9 from which the waveform 10 is derived.

Basically, the system of this invention can be divided into three fundamental parts, FIGURE 3. One part is the circuitry 14 which is used to determine the decision level at the input. A second part is the circuitry 15 which determines when the decision level will be compared to a level on the output waveform. This includes an electronic delay circuit 16 and a reset and strobe circuit 17. The last part is a control circuit 18 which interprets the decision made by the tunnel diode 13, and controls either the strobe position or the decision level.

The strobed tunnel diode has three inputs (FIG. 7), a test waveform input 19, a reset and strobe input 20 and a bias input 21. In normal operation the input of the waveform 10 can neither set nor reset the tunnel diode 13 of the sampling circuit 12. Only the superimposition of the strobe pulse 25 at the input has the capability of setting the tunnel diode 13. A reset pulse 33 which is normally employed before each strobe pulse 25 leaves the tunnel diode in the reset or low voltage states, see FIGURES 1 and 7.

In general, strobe signal 25 is large in magnitude as compared to the test waveform 10, with both the strobe 25 and waveform 10 required to fire the tunnel diode 13. The effect, of this, is the superimpositioning of the strobe on the waveform to form a composite signal 26 (FIGURE 3) with an artificial peak level on the test waveform 10 at the point where the strobe signal 25 occurs. With the amplitude of the strobe signal 25 fixed, its level comprises a constant, and the level of the test waveform 10 can be expressed in terms of a decision level on the waveform plus a constant at the time of the occurrence of the strobe.

Employed in conjunction with the strobed tunnel diode sampling circuit is a decision circuit 27 and a bias control circuit 28 which function together in a manner similar to conventional slide-back sensing circuits such as the previously referenced T. D. Sylvan article "Tunnel Diode Slide-Back Sensing Circuits," pp. 60–64, EEE, September 1963. In this manner, a tunnel diode 13 is biased to some appropriate level so that it will fire when the composite signal 26 arrives (i.e. the superimposed strobe signal 25 on the test waveform 10). The firing of tunnel diode 13 will present a high voltage to the input (FIGURE 7) of a high gain operational amplifier 29, having a slewing output, in the decision circuit 27, which functions as a detector and provides a direct current voltage at the slewing output of the amplifier 29 which, in turn, is inverted by the unity gain inverting operational amplifier 30 and fed through the operational amplifier 31, in the bias control circuit 28, to the anode of the tunnel diode 13 in a polarity inverse to the positive change which appeared across the tunnel diode. This reduces the bias of tunnel diode 13 with a direct current voltage proportional to the voltage level at the slewing output of the operational amplifier 29 in decision circuit 27. In effect, the operational amplifier 31, of the bias control circuit 28, is employed to control the voltage level $E_3$, at terminal 21, from the two voltages $E_5$ and $E_6$, where $E_5$ is used to provide a predetermined initial constant voltage level by means of the zero adjust resistor 32, and the other voltage $E_6$ has a direct relationship to the output level of decision circuit 27. The operational amplifier 31, employed in the bias control circuit 28, was the Analog Devices Model 210 which has an offset voltage drift of 1 $\mu$v./° C. and a current offset drift of 5 pa./° C. The gain of this amplifier is $10^8$ which together with a small signal unity gain of 20 mc. provides a useful gain which extends far out in frequency. The indicated gain of the described amplifier is merely illustrative of the high gains contemplated for the devices in the bias control circuit 28; and accordingly various gains of higher and lower orders, as will be understood, may be employed. Generally such gains will normally be in the range of about $10^4$ to infinity and preferably in the range of about $10^5$ to about $10^9$. However, such an amplifier with the indicated operative ranges are hereby defined and employed in the specification and claims as a "high gain amplifier" and as an amplifier having a "high gain" output voltage.

Figure 11:
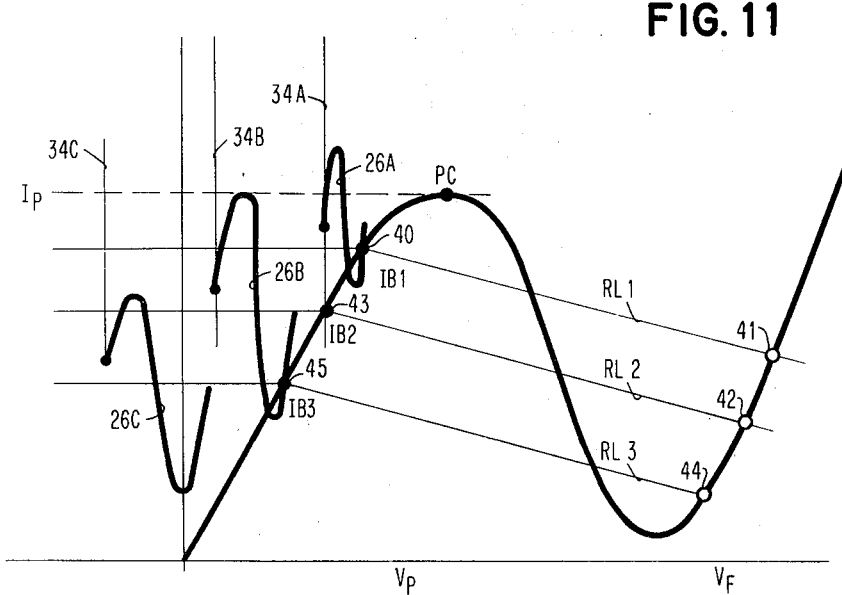

The load line $R_L$ shown in FIGURE 11 represents the bias conditions of tunnel diode 13 with the strobe signal 25 superimposed on the 10% point on the ramp of the test waveform 10. In operation the strobe signal 25 and a reset signal 33 are synchronized with the test waveform 10, where the reset signal 33 occurs, and is followed by the strobe signal 25. As a result the tunnel diode 13 is always in the reset state before the strobe pulse occurs, but the time that the tunnel diode can be set after the strobe occurs is very long compared to the time between the reset pulse to the strobe pulse. In this manner, the bias of the tunnel diode will be progressively changing in accordance to the slewing output of the decision circuit 27.

Figure 8:
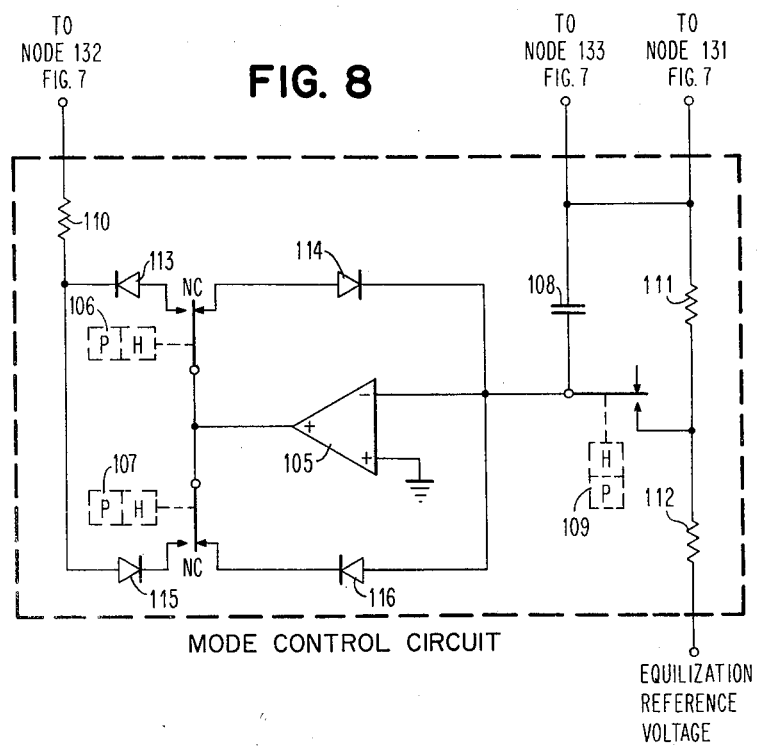
FIGURE 8 is a curve for illustrating the operation of the invention with respect to a voltage-current characteristic of a tunnel diode.

To understand the influence of the signal amplitude on the frequency response, reference may be made to the mechanism of the tunnel diode bias, particularly in conjunction with the current-voltage characteristic of the tunnel diode of FIGURE 8 and the current flows shown within the sampling circuit 12 of FIGURE 7. FIGURE 11 shows the tunnel diode characteristics and three bias points (IB1, IB2, IB3) for the input signals at three different levels of an applied bias current. In general, the tunnel diode bias current $I_b$ is brought during the measurement, to such a value that the most positive peak current $I_m$ or $I_{in}$ max. of the composite signal 26 (e.g. the peak current of strobe pulse 25 and test waveform 10 at the point of superimposition) together with the bias current $I_B$ is equal to the peak current $I_p$ of the tunnel diode. Thus the peak current $I_p$ may be represented by the following expression where $$I_p = I_B + I_{in}\text{max.}$$

where $$I_{in}\text{max.} = I_{sig} + I_{strobe}$$

accordingly $$I_{sig} = I_p - I_{strobe} - I_B$$

however, since $I_p$ represents a fixed characteristic of the tunnel diode and $I_{strobe}$ is also fixed, these two currents may be combined as a constant C. Therefore the expression for the current of the test waveform 10 reduces to $$I_{sig} = C - I_B$$

and conversely $$I_B = C - I_{sig}$$

Thus, as can be seen from the above, when the current of the test waveform 10 (at the point of superimposition of the strobe pulse 25) exceeds the peak current of the tunnel diode, $I_p$, the tunnel diode switches to its high voltage state and changes the bias current such that the above equation is true.

Thus, as indicated above, when the peak level of the composite signal 26, resulting from the superimpositioning of the strobe 25 on test waveform 10, fires tunnel diode 13, a higher voltage is presented to the operational amplifier 29 in decision circuit 27 to provide a slewing output voltage which is fed through amplifiers 30 and 31 to the anode of tunnel diode 13 in a polarity inverse to the positive change which appeared across the tunnel diode. The result is that, as tunnel diode 13 is fired, the DC bias on it, while it remains in its high voltage state, will be slowly decreasing in direct proportion to the slewing output of the decision circuit 27, until the appearance of the reset signal 33.

However, since reset signal 33 is closely followed by the strobe signal 25, the tunnel diode can be in the set state far more than it is in the reset state. The net result is that the bias across tunnel diode 13 will be progressively dropping to the level being sought. Thus after each reset signal 33 appears at the tunnel diode 13 and resets it to its low state, the substantially immediate reappearance of the strobe 25 will again fire the tunnel diode if the amplitude of the peak of composite signal 26 plus the value of the decreased bias across the tunnel diode 13 is sufficient to fire it to its high voltage stage. On refiring of the tunnel diode, the process will be repeated with the DC bias of the tunnel diode dropping even lower in direct proportion to the slewing output voltage of the decision circuit 27.

Finally, the DC bias of the tunnel diode 13 will be sufficiently reduced so that the peak level 34 of the composite signal 26 (i.e. the superimposed strobe and test waveforms 25 and 10) will not have sufficient amplitude to fire the tunnel diode 13. Thus, after resetting by reset signal 33, the tunnel diode will not fire at all. As a result the slewing output of the decision circuit 27 will be reversed in polarity which when fed back to the tunnel diode 13 will begin to gradually increase the bias across it; and when the bias across the tunnel diode increases sufficiently, the peak amplitude 34 of the composite signal 26 will once again be able to fire the tunnel diode 13. As can be seen, the bias across tunnel diode 13 will change to a DC level dependent on the peak amplitude of the composite signal 26, and will then oscillate about that DC level. The level about which the bias finally oscillates is therefore indicative of the peak amplitude of the composite signal 26, and may be measured as an output level by meter 35 which may be conveniently calibrated by subtraction from the output value of the fixed amplitude of the strobe signal 25. The reduction of bias on tunnel diode 13 along its current voltage characteristic curve is shown in FIGURE 11. As noted above, the reset signal 33 closely followed by the strobe signal 25, the tunnel diode 13 can be in the set far more than in the reset state. As a result there is very little movement away from the sought-after decision level; and after the final level is reached, the bias of the tunnel diode 13 can decrease further for the time of only one cycle of the composite signal 26 before the tunnel diode bias starts to increase again. As a result, these two facts permit the desired measurement in the least time and with the least ripple.

For purpose of simplicity, a three stage reduction in bias across tunnel diode 13 to the sought after level is shown in FIGURE 11. As shown in the drawing, 26a, 26b and 26c represent the successive positions (along the current-voltage characteristic curve of tunnel diode 13) of composite signal 26 obtained by the superimpositioning of a strobe signal 25 on a test waveform shown here for convenience as a sinusoidal waveform. On initiation of the test, the composite signal is represented by 26a with the tunnel diode biased at point 40. With the appearance of the composite signal 26a, a firing of the tunnel diode 13 it will be biased along load line $R_{L1}$ to point 41; and, in accordance with the foregoing description of the operation of the decision circuit 27 and bias control circuit 28, tunnel diode 13 will be progressively reduced in bias during its high voltage state to point 42. With the appearance of the reset signal prior to the next occurrence of the composite waveform, e.g, 26b, tunnel diode 13 will be reset to its low voltage state, under the reduced bias, to point 43. Normally upon the resetting of tunnel diode 13 to its low voltage state, the bias across it tends to increase. However in view of the substantially immediate reoccurrence of the strobe signal, the length of time in which the tunnel diode exists in its low voltage state is extremely short and negligible, and for this reason the increase in bias is not shown in FIGURE 8.

Upon the reoccurrence of the composite signal, e.g. 26b, the tunnel diode is again fired to its high voltage state to point 42, during which condition it is again reduced in bias to point 44 with resetting to point 45 upon the occurrence of the next reset signal 33. At point 45, the peak amplitude 34c of the following composite signal 26c plus the reduced bias at point 45 will be sufficient to fire tunnel diode 13 to its high voltage state at point 44. With the load line $R_{L3}$ representing the final bias condition, before and after the strobe pulse occurrence, when the amplitude of the 10% point of the test waveform 26 is equal to the decision level, the final bias will oscillate about point 45 along the load line $R_{L3}$ between its low and high voltage states.

In practice, the system can be programmed to measure a voltage at any point along the test waveform 10 at any selected point in time, as for example, from an initial impulse signal such as a sync or clock pulse 9 (FIGURE 1) which initiates a component under test and a novel adjustable delay circuit described below. In this manner, the strobe signal 25 is controllably traversed in fixed timed changes across the test waveform 10 to enable the measurement at any point along the waveform with respect to a reference point in time such as the position of the strobe pulse with respect to the clock or sync pulse from which the signals are derived. An embodiment of a novel adjustable delay circuit disclosed in copending application, U.S. application Ser. No. 663,590, filed Aug. 28, 1957 by John F. Merrill and Hugh R. Stirling was found particularly effective for the foregoing is described below.

As noted above, the voltage level decision of the tunnel diode 13 in sampling circuit 12 can be varied to determine the amplitude along any point along the test waveform 10. In the system here contemplated, the decisions made by tunnel diode 13 automatically tell which way to adjust the decision point. The final value to which the decision point is automatically adjusted corresponds to the amplitude and conversely a voltage measurement of the test waveform 10 at a specific reference point in time with respect to a clock or sync pulse. The selection of a point on test waveform 10 is accomplished by means of the controllably variable strobe pulse 25 applied to the tunnel diode 13 of the sampling circuit 12. Normally, the strobe pulse 25 is preceded by a reset pulse 33 to assure that tunnel diode 13 is in the reset condition. To this end, an accurate linear relationship is established between a reference control voltage and the desired delay of strobe pulse 25 from a sync or clock pulse so that the position of the strobe pulse 25 can be known from the value of the selected reference control voltage. In its simplest configuration the circuitry may be considered, with reference to FIGURE 3, as composed of an electronic delay circuit 16, and a reset and strobe circuit 17.

The electronic delay circuit 16, of an actual system with reference to FIGURES 1 and 9, included a bistable switching stage 56 which is used to turn on a 15 ma. current generator 57. This current step provides the current required by a 10 ma. current sink 58 with an additional 5 ma. available to charge the capacitance (i.e. about 5 pf.) at Node A. It is noted, that before the current step occurred, the 10 ma. current sink 58 was drawing its current from the reference input 61, connected through the switching circuit 62 (with the switches thrown as shown in FIGURE 7) to a variable voltage reference source 63 and from a 5 ma. current generator 64 through their respective disconnect diodes 65 and 66. As a result this state of the circuit makes Node B initially equal in potential to the selected voltage level in reference source 63. Thus, the two diodes 65 and 66 have equal currents flowing through them, and therefore equal voltage drops; and with equal temperature coefficients associated with the diodes 65 and 66, each compensates for the other during this operation. When the indicated current step occurs, both diodes 65 and 66 will be turned off. Node B is provided with more shunt capacity (i.e. about 10 pf.) from the ranging circuit 67; and since both Nodes A and B have 5 ma. available to charge their shunt capacities, the voltage at Node A will rise faster than the voltage at Node B and thus turn off diode 66. As a result, the reversed biased diode 66 at this point separates all transients from Node B. Each of disconnect diode 65 and 66 employed is a majority carrier diode so that reverse recovery is not a problem.

In the specific system described, the reference voltages employed are negative voltages, and thus the voltage at Node B will always rise to ground. A level comparator 68, which is connected to Node B, will switch when the voltage at Node B reaches ground to trigger an output stage which includes a wave shaper circuit 69 and a differentiator 70.

In addition, the level comparator 68 is also connected through a feedback delay circuit 71 to the input of the bistable switching stage 56 whereby the bistable stage is reset after a short delay. Resetting of the bistable switching stage 56 turns off the 15 ma. current generator 57, and allows the 10 ma. sink 58 to restore both Node A and Node B to their initial voltage. The delay obtained in the trigger pulse from level comparator 68 with respect to the sync or clock pulse 9 is a linear function of the reference voltage input selected from the reference voltage source 63. In addition, the changing of the shunt capacity at Node B by means of the ranging circuit 67 will also provide a corresponding change in the slope of the ramp at Node B, and thus, likewise, the scale factor or range of the delay circuit.

In operation the input impedance of the bistable switching circuit 56 is, preferably, a purely resistive input to prevent reflections back to the source of the sync pulse 9. This is obtained by means of the series inductor-resistor circuit 72 shown in FIGURE 9.

A 430 ohm value was employed for the series resistor 140 so that a 2.5 volt sync pulse 9 would supply in excess of 5 ma. to the bistable diode circuit. A 56.6 ohm value was used for resistor 76 to match the circuit to a 50 ohm coaxial input 77. The time constant of resistor 140 and capacitor 125 is long enough so that the input rise time of the sync pulse 9 will not be degraded when it is coupled into the tunnel diode 78 of the bistable switching stage 56. Also the time constant obtained is sufficiently short to avoid high repetition rate effects.

The tunnel diode 78 selected for use in the system was the 22 ma. GE TD254A, which in the circuit described, is biased with 19 ma. in the low voltage state. The voltage across tunnel diode 78 is limited in the high state to about 0.4 volt by means of a transistor 79 of the first current generator 57. The resultant current into Node C is 17 ma. two of which are required to hold the tunnel diode 78 in the high state, with the remaining 15 ma. supplied to Node A through transistor 79. Preferably transistor 79 is a germanium transistor to assure proper current division when tunnel diode 78 switches. However, the $E_{18}$ power supply can be adjusted to compensate for any variations in the selection of tunnel diode 78 employed in the circuit.

A 150 ohm load line employed in conjunction with tunnel diode 78 is composed of two resistors, a 100 ohm value resistor 80 (of the feedback delay circuit 71 in FIGURE 9) and a remote 50 ohm value resistor 81 (of the level comparator circuit 68 in FIGURE 10) which is connected in series with resistor 80 through a 50 ohm transmission line 82 so that any stray signals that originate at Node C will be absorbed at Node D whereby the load line for tunnel diode 78 will remain resistive. The purpose of Node D is to provide access for a terminal 83 for a reset pulse which is fed back to tunnel diode 78 to return it to its low voltage state. In addition the transmission line 82 also forms part of the feedback delay circuit 71 to provide a delay for the reset pulse.

To initiate the ramp at Node B only the tunnel diode 78 and the grounded base transistor 79 were required to switch on. Thus, since this is all the current mode switching, a minimum delay is obtained in initiating the ramp at Node B. Turning off of diode 65, by the rising ramp at Node A, isolates Node A from the reference voltage, of the reference source 63, and the turning off of diode 66 isolates Node B from Node A. The linearity of ramp at Node B is dependent on the linearity of the 5 ma. current generator 64 versus the voltage, and the linearity of the shunt capacity of circuit 67 versus the voltage generated. By biasing the base of transistor 85 at +6 v. DC and only allowing the ramp to operate from −6 v. to 0 v., any change in current is minimized. It was found that three components tended to contribute to non-linear shunt capacity at Node B, e.g. diode 66, transistor 85 and diode 86. Normally, as the ramp rose at Node B, the voltage across diode 66 and the base emitter junction of transistor 85 would decrease to tend to cause their contribution to shunt capacity to increase.

As will be appreciated, the change of capacity across the base junction of the transistor is when the voltage across it is the least. Accordingly, the base of transistor 85 was biased at 6 volts to assure that the voltage across the junction would be at least 6 volts during the ramp time. The shunt capacity of the diodes is of the order of just a few tenths of a pf., and since the capacity of diode 86 is in series with the capacity of transistor 87, in the level comparative circuit 68, this makes the equivalent shunt capacity caused by diode 86 to be less than its own capacity. Because the ramp at Node A is rising faster than the ramp at Node B, the capacity across diode 66 is actually caused to subtract it from the total shunt capacity at Node B. As the voltage at Node B increases the voltage drop across diode 66 also increases which decreases its shunt capacity. Thus, in accordance with this circuit, the total effect of these components is to cause the effective slope of the longer ramp, at Node B, to be faster than the effective slope of the shorter. For the long ramp, at Node B, the voltage at Node A will be clamped thus causing the capacitance of diode 66 to be added to the total shunt capacity at Node B instead of being subtracted from it. This will cause the effective slope of the longer ramps to be slower and more like the shorter ramp.

Figure 10:
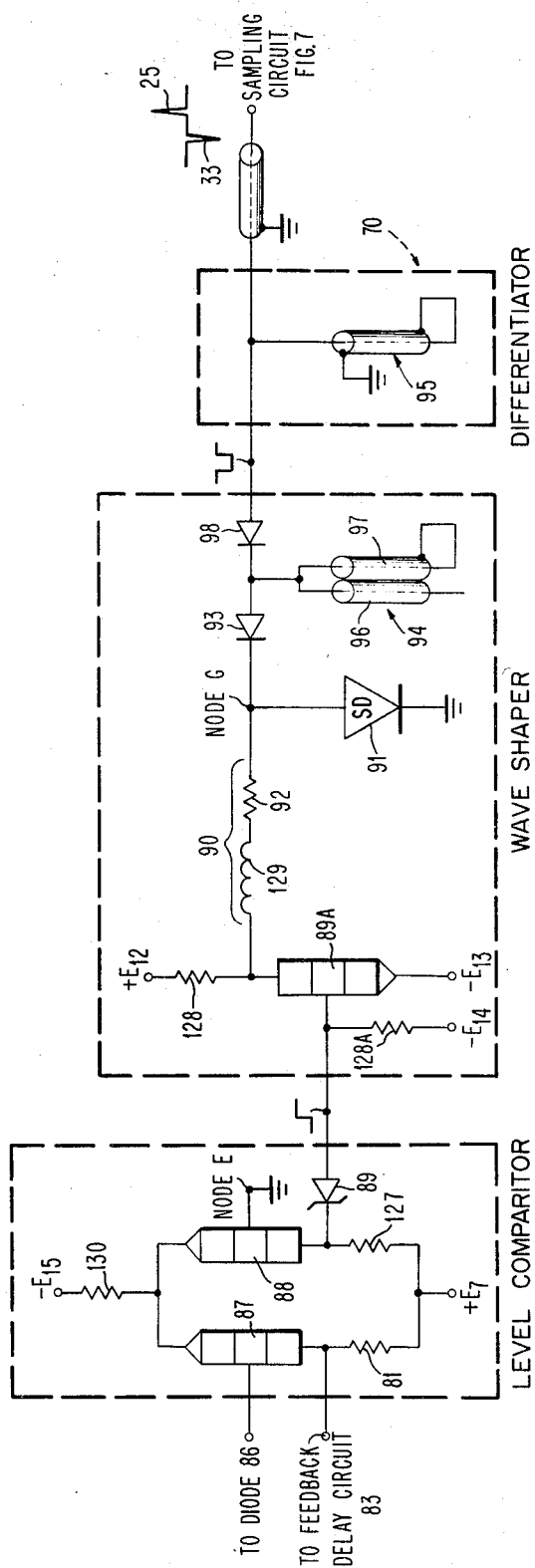

The level comparator 68 includes the two transistors 87 and 88 which are connected as a differential pair with an emitter current of 50 milliamps, see FIGURE 10. Transistor 88 is normally on and transistor 87 is normally off. When the ramp at Node B starts to go above ground, it will begin to turn on transistor 87 and switch the current from transistor 88 to transistor 87 and into Node D which has initial load of 25 ohms, with the load consisting of a 50 ohm resistor and a 50 ohm transmission line. The transmission line routes the signal back to the input bistable switching stage 56 and resets it and eventually returns the ramp to its original voltage, e.g. the reference voltage selected from the variable reference source 63. The signal from the level comparator circuit 68 at Node F is used as the output signal for the next stage which includes the wave shaper circuit 69 and the differentiator circuit 70. In operation, since transistor 88 is normally on, its power dissipation is important but in this case when it is on, the voltage across it will be less than a volt since the current it is drawing is controlled at 50 ma., to control the power in it to less than 50 milliwatts, well within its rating. A Zener diode 89 is used to couple the signal at Node F into the base of transistor 89A of the wave shaper 69. As a result, transistor 89A will switch on and its collector will move from an applied +.8 volt to approximately −6 volts. This will impress 6 volts across an RL network 90 to a snap diode 91 which was biased at 15 ma. in the circuit. The LR time of the network is approximately 12 nanoseconds which is short enough to allow the reverse current flowing to the snap diode 91 to build up significantly before it snaps, but still long enough so that the leading edge of the step which occurs at Node G is not loaded down by the 27 ohm value resistor 92. This step is coupled through diode 93 into transmission line network 94 of the wave shaper circuit 69. The transmission line network 94 functions to convert a current step waveform into a voltage pulse which is fed to the differentiator circuit 70 where it is converted into a negative and a positive spike by differentiation accomplished by means of a four inch shorted transmission line stub 95. The spacing between the spikes, and accordingly, the length of the voltage pulse from the wave shaper circuit 69, is determined by a pair of five foot transmission lines 96 and 97 in the wave shaper circuit 69.

The two five foot line stubs, are each 50 ohm transmission lines (one open and one shorted), which are electrically identical to a single ten foot 25 ohm shorted line. By means of the combination of the two five foot transmission lines in the circuit, a first pair of reflections is obtained from the end of lines which are equal in magnitude but opposite in polarity which causes total reflection, while the second pair of reflections are equal in magnitude and polarity. The output of the two transmission line stubs 96 and 97 is separated from the output cable and the four inch shorted stub 95 by a diode 98 to isolate the output from any small disturbances caused by multiple reflections in the two longer lines. In the circuit described, the propagation delay of the cable was 1.5 nanoseconds/ft. to establish the width of the reset and strobe pulses to 1 nanosecond, and the reset and strobe pulses to 1 nanosecond, and the spacing between them to 30 nanosecond (e.g. 1.5 nsec./ft. x 5 ft. x 4).

In an actual system constructed in accordance with this invention, the following components, currents and voltages were employed which had the following values:

Voltages $+E_2 = +1.7$ v. (strobe)    $+E_{12} = +15$ v. DC
$-E_5 = -15$ v. DC    $-E_{13} = -6$ v. DC
$+E_7 = +6$ v. DC    $-E_{14} = -15$ v. DC
$+E_8 = +6$ v. DC    $-E_{15} = -15$ v. DC
$+E_9 = +15$ v. DC    $+E_{16} = +6$ v. DC
$+E_{10} = +2.5$ v. DC    $-E_{17} = -15$ v. DC
$-E_{11} = -.3$ v. DC    $+E_{18} = +3$ v. DC Resistors, ohms 32—0 to 3K    92—27.4
46—562    110—100K
47—316    111—10K
48—1.2K    112—10K
49—1.2K    117—620
50—2K    118—560
51—5.6K    119—100, reductor
52—100K    120—1.6K
53—100K    121—910
54—10K    127—110
55—10K    128—510
75—430    128A—1K
76—56.6    130—270
80—100    140—430
81—50

Capacitors

59—100 mfd.    108—.01 mfd.
99—500 pfd.    124—.1 mfd.
102—.05 mfd.    125—18 pfd.
103—.05 mfd.

Amplifiers

29—Philbrick PP65
30—Philbrick PP65
31—Analog Devices Model 210
105—Analog Devices Model 210

Transistors

79—2N2929    88—2N2369
85—2N2929    89A—2N3461
87—2N2369    122—2N3960

Coils

126—3.3 μhenries
129—.33 μhenries

Diodes

| | |
|---|---|
| 65—hp2301 | 101—hp2301 |
| 66—hp2301 | 113—hp2301 |
| 86—hp2301 | 114—hp2301 |
| 93—hp2301 | 115—hp2301 |
| 98—hp2301 | 116—hp2301 |
| 100—hp2301 | 123—hp2301 |

Tunnel diode

13—GE TD 253A
78—GE TD 254A

Zener diode

89—Mot.4736A

Snap diode

91—hp0113

To make variable measurements, the condition of the tunnel diode 13 and the sampling circuit 12 must be sensed. This is done by attaching a 100K ohm value resistor 52 between a tunnel diode and a summing point of the operational amplifier 29. When the tunnel diode is in the reset state, the current supply to the summing point of the amplifier is approximately designed in this circuit to be 1 microamp. When the tunnel diode is set, this current, in the circuit above described, is approximately 5 microamps. When taking away a fixed current of 3 microamps from the summing point a net current of either ±2 microamps must be supplied through the feedback network. For a simple capacitor feedback element, the output of the amplifier 29 would be a continuously changing voltage. The voltage would be decreasing whenever the tunnel diode is set and increasing whenever the tunnel diode 13 is in the reset condition. The time the tunnel diode 13 is reset is between the reset pulse 33 and the closely following strobe pulse 25 can be neglected because it is so short (30 nsecs.) compared to the time between the strobe pulses (10 microsecs.) when operating at 100 kc.

If the tunnel diode 13 keeps remaining in the set condition then the voltage decision must be increased to determine what the signal voltage is of the test waveform 10. However, the output of amplifier 29 is the voltage which is normally slewing negatively. The addition of an inverting amplifier 30 produces a positive slewing voltage when can be used to raise the voltage decision level until tunnel diode 13 does not set. Then the output of the slewing amplifier 29 starts positive, causing the output of the inverting amplifier 30 to decrease until the tunnel diode 13 sets again. This feedback action will keep moving the voltage decision level above and below the two signal levels, at the time of the occurrence of strobe 25. The average value of the control voltage is then directly related to the amplitude of the test waveform 10 at the point of the superimposition of the strobe pulse 25. As will be understood, this seeking action causes a ripple in the analog answer obtained by means of meter 35. This ripple is minimized in acordance with a further modification of this invention.

In accordance with this modification, it was found to keep the ripple small requires that the feedback capacitor 99 of the slewing amplifier 29 should be large. However, to reach the analog answer fast from the given setup condition requires that the capacitor should be small. When the control voltage is far from the answer a large number of consecutive identical decisions are required to make the control voltage reach the proper value. However after the control voltage has reached the proper value, then the decisions will alternate. The feedback circuit modification shown in the decision circuit of FIGURE 7 takes advantage of this. When the decisions are alternating, the potential at the common juncture 104 (of the diodes 100 and 101 and capacitors 102 and 103) will be between the forward voltage drops of the two diodes 100 and 101. In this manner, the equivalent feedback capacitance will be a combintion of all the capacitors, e.g. 99, 102, 103. However, when the consecutive decisions are the same, one of the diodes will be conducting to provide the effect of a low impedance to ground thus removing the two capacitors 102 and 103 from the feedback loop. For a fast slewing of 10 volts in 5 msecs., the small capacitor 99 should preferably be less than 1000 pfd., whereas to obtain the low ripple of 1 mv., the total capacitance of this amplifier circuit must be more than 20,000 pfd. An overall response of 10 msecs. was obtained by employing values of 0.05 μf. for the two large capacitors 102 and 103 and a 500 pfd. value for the small capacitor 99.

In order to utilize this invention for a time measuring system, the output of the feedback circuit is not brought back to the DC bias of the tunnel diode 13 rather the output of this feedback drives the electronic delay circuit which transforms a voltage into a time delay proportional to that voltage. This is accomplished by throwing the switches to the other set of contacts shown in a switching circuit 62 of FIGURE 7. The electronic delay circuit is then utilized to synchronize the time position of the strobe pulse obtained. Thus the time measurements are accomplished in a similar manner. The voltage devision level is held constant and the electronic delay reference voltage is varied to find the point in time at which that voltage occurs.

Figure 5:
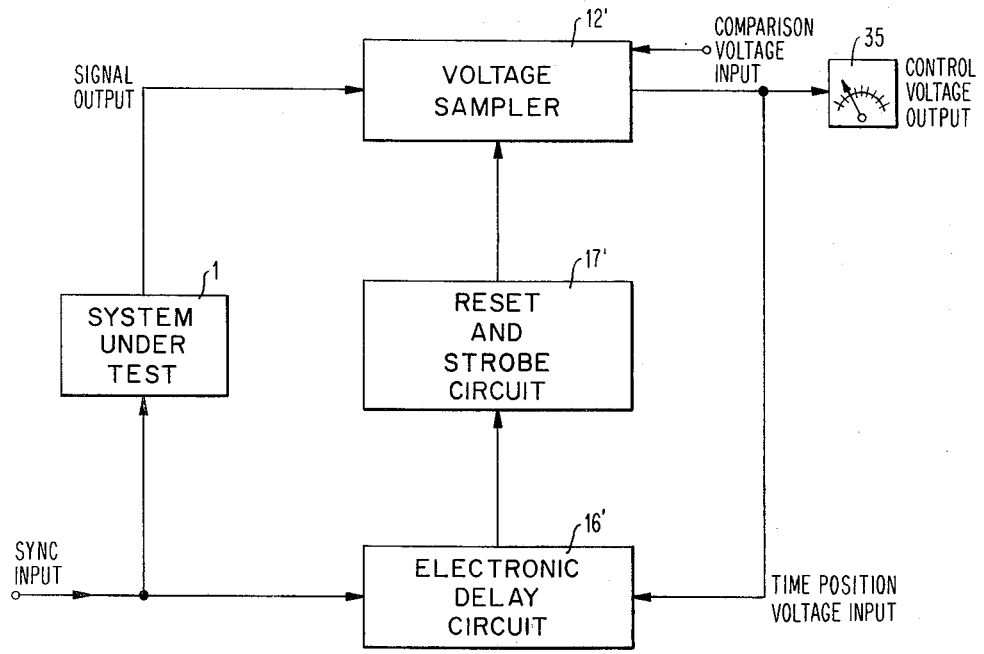
FIGURE 5 is a simplified block diagram showing the application of the invention as a time measuring system.

FIGURE 5 broadly shows the interconnection of basic functional blocks to form a time measurement system. As shown in this figure, the comparison voltage is programmed for the desired signal voltage level. The control voltage output is used as a time position voltage input. In this manner, after each comparison is made by the voltage sampler 12', the sampler positions the strobe closer to the desired voltage level of the signal. Negative transitions require opposite phase feedback for the control voltage in positive transitions. Accordingly, the phase of the control voltage is programmed to correspond to the direction of the transition to be measured. Setting of the initial value of the control voltage determines which way the strobe pulse will approach the point of interest. Some signals may pass through the voltage level of interest more than once but in such instances, the setting of the initial value of the control voltage can be used to tell the system which point to search for.

More specifically, this decision point on the positive transition at the output of the inverter amplifier 30 is used as a control voltage to the electronic delay circuit aforedescribed. A point on a negative transition is found by using the slewing amplifier output as a control voltage. In all the measurements, the answer is always obtained by measuring the final value of the control voltage by meter 35. More specifically, after tunnel diode 13 is fired, by the portion of the amplitude of the composite signal 28 corresponding to the point of superimposition of the strobe 25 on the test waveform 10, the output voltage of feedback circuit will decrease, which in turn will change the time delay in the form of a control reference voltage to the time delay circuit. This in turn will change the time position of the strobe 25 relative to the test waveform 10 such that the tunnel diode 13 will be ready to fire at a different time position of the input signal. The bias upon tunnel diode 13 instead of coming from the feedback circuit now comes from a variable reference source 63. Thus after the tunnel diode is fired, the strobe pulse 25 will slowly sweep along the test waveform 10, until combined value of the test waveform 10 and the strobe pulse 25 (at the point of superimposition) reaches a level proportional to the DC bias initially adjusted through tunnel diode 13. The amount of time swept by strobe pulse 25 is proportional to the change in voltage across the output of the feedback circuit which is fed to the input of the electronic delay circuit. This voltage is measured by meter 35 which is calibrated to give an analog voltage indication of the time interval from a time reference such as a sync or clock pulse to the strobe which can be synchronized to any input event desired.

A digital successive approximation scheme could also be used to obtain an answer faster than the aforedescribed analog seeking scheme, but might be more sensitive to noise. the analog approach has the effect of averaging out noise plus the advantage of keeping the tunnel diode 13 in the sampling circuit 22 always operating at the same power level regardless of the input signal. In addition, the use of a monostable sampling head thus becomes feasible whereby it can operate accurately with a digital scheme or simply on a go/no-go mode.

As shown in FIGURES 13 and 14, modification of the sampling circuit 12 to include the use of a monostable discriminator 12a makes both a go/no-go mode of operation feasible and also an accurate digital approximation scheme such as employed in commercial digital voltmeters feasible as shown in FIGURE 13. Two separate sources of reference voltages under control of a conventional logic circuit 150 can be used, one for the time position input 151, and the other for the comparison voltage input 152. The decision circuit 27 (e.g. voltage sampler 12″) can be used to provide a digital output which is then used by the logic circuit 150 to successively change either the time reference input 151 or the comparison voltage input 152 to measure time or voltage respectively. For a fixed value of time reference voltage and comparison voltage, the digital output of the decision circuit can be used to provide a go/no-go indication.

In accordance with another feature of this invention, the circuit described as can be adapted for peak detection in a number of ways. One way would be, to not synchronize the strobe pulse 25 with the test waveform 10, in that many strobe pulses occur before each reset pulse. This would only be good for positive peaks. The preferred method, as shown in FIGURE 8 is the use of a mode control circuit which employs an amplifier 105 for detection of the direction of change of the output at the inverter amplifier 30 in the decision circuit 27. With the relays 106 and 107 in the position shown, the peak detecting amplifier 105 merely charges or discharges the capacitor 108 connected to the summing point of amplifier 105. By activating relay 106 this circuit is modified so that capacitor 108 can only charge. When capacitor 108 tries to discharge the peak detector amplifier 105 will feed a current into a summing point of the slewing amplifier 29 to prevent its output and thus the inverter amplifier's output from moving. Therefore, the control voltage can only increase and only when it is less than the amplitude of the test waveform signal 10. Thus the strobe can be moved back and forth in time through this operation to determine the peak value within a particular range. Conversely, by activating relay 107 instead of relay 106, the value of the negative peak or valley can be found.

Figure 12:
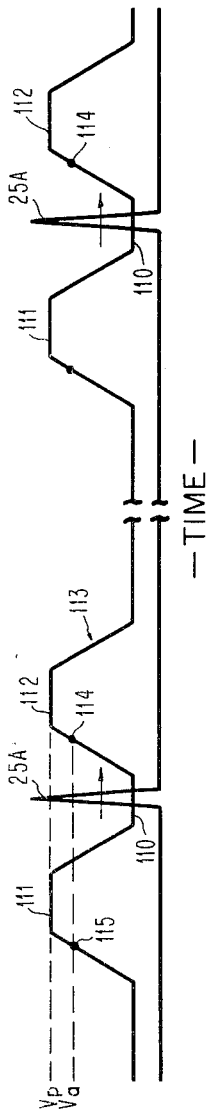
FIGURE 12 is a schematic representation of a composite signal resulting from the application of the invention to a multivalued waveform.

Activating both relays 106 and 107 will freeze the control voltage at whatever value capacitor 108 is charged up to. Activating relay 109, the control voltage can be forced to be equal to "minus" an initialization voltage for presetting of the strobe pulse 25 at the desired point along the test waveform 10. This is especially useful when measuring time on a multivalued waveform such as shown in FIGURE 12. In one application a strobe pulse 25a is preset in the valley 110 between the component pulses 111 and 112 of a multivalued waveform 113 for purposes of measuring the amplitude at the 90% point 114 along the leading ramp of the component pulse 112 in preference to the 90% point 115 along the leading ramp of the component pulse 11. The preferential scanning of strobe pulse 25a toward the 90% point 114 of component test pulse 112 is readily apparent from the foregoing description of the invention. As indicated above, the superimpositioning of a strobe pulse along the minimum level of a test waveform activated the tunnel diode 13 of sampling circuit 22 whose output is detected by the slewing amplifier 29 and inverted by amplifier 30 to provide an output control voltage to the electronic delay circuit. As will be apparent from the foregoing description, this changing control voltage causes the strobe pulse to preferentially move along a test waveform until it is superimposed at the desired point therealong as determined by a set voltage selected from the variable reference source 63. Accordingly with the superimpositioning of the strobe pulse 25a in the valley 110 of the waveform 113, the voltage detected by tunnel diode 13 is a minimum which is detected by slewing amplifier 29 and provided as a positive slewing voltage at the output of inverting amplifier 30 which will progressively scan the strobe pulse toward the leading edge of component pulse 112 until the strobe pulse 25a is superimposed at the 90% point 114 of the component pulse 112 to corresond to the said voltage impressed at the input of the amplifier 31 in bias control circuit 28 by selection of the appropriate value from the variable voltage reference source 63 corresponding to the desired 90% amplitude of the desired component pulse in the multi-valued waveform 113. Thus the time at which the control voltage starts determines which voltage point it will seek.

If desired two channels, as in FIGURE 3, can be used to determine the time between two specific points on two waveforms or on the same waveform. With the proper multiplexing of the two channels with each other described in accordance with this invention, many measurements can be made such as, time between percent points instead of voltage points, positive and negative peak detection, impedance measurements, coefficients of reflections of a circuit, and the like.

Accordingly, while the invention has been particularly shown and described with reference to the preferred embodiments, it will be understood by those skilled in the art that various changes in form and detail may be made therein without departing from the spirit and scope of the invention.

What is claimed is:

1. A pulse measuring system for measuring the voltage levels along selected points of a waveform, comprising:
   (A) means for generating a sharp-spiked sampling signal including
      (a) a source of selectively variable reference potentials and
      (b) means for controllably delaying said sampling signals a predetermined amount in response to and proportional to a selected reference potential;
   (B) a tunnel diode circuit;
   (C) means for applying said waveform to said tunnel diode circuit;
   (D) bias means for biasing said tunnel diode circuit including
      (a) control means for providing a base bias to maintain said tunnel diode in a first operating state,
      (b) means for superimposing said sampling signal on said waveform to provide a composite test signal for control of said tunnel diode to a second operating state
   (E) a detecting amplifier circuit means responsive to the operating state of said tunnel diode circuit for providing a logic level output voltage; and
   (F) logic circuit means for
      (a) selecting a predetermined one of said selectively variable reference potentials, and
      (b) responsive to said logic level output voltage for control of said bias means and control of said base bias thereof in successive approximations.

2. A pulse measuring system for measuring the time characteristics of a waveform, comprising:
   (A) means for generating a time-variable sharp-spiked sampling signal including
      (a) means for controllably delaying said sampling signal a predetermined amount in response to and proportional to an applied control potential;
   (B) means for superimposing said sampling signal on said waveform to provide a composite signal;

(C) a selectively variable source of reference potentials representing desired magnitudes on said waveform;

(D) means for continuously comparing the voltage level of the peak of said composite signal corresponding to the point of superimpositioning of said sampling signal on said waveform with a selected value from said source of reference potentials to provide an output control signal commensurate with said comparison; and (E) means for applying the said output control signal to said sampling signal generating means as said control potential thereof for correspondingly varying the delay of said sampling signal until the said peak of said composite signal coincides with a selected value from said source of reference potentials.

3. The pulse measuring system of claim 2 wherein said comparison means includes a logic circuit means to generate said output control voltage in successive approximations.

4. The pulse measuring system of claim 2 including means for adapting said system for peak detection.

5. The pulse measuring system of claim 2 including a polarized integrating circuit means connected in bypass across said detecting amplifier circuit means for
(A) sensing the direction of polarity change thereof and
(B) providing an output from said polarized integrating circuit means to the input of said detecting amplifier circuit means when the direction of polarity change is opposite to a predetermined change in polarity whereby the output of said detecting amplifier circuit means is
   (a) maintained constant against response to one polarity of change in amplitudes of said waveform and
   (b) responsive to the opposite polarity of change in amplitudes of said waveform.

6. The pulse measuring system of claim 2 including means for establishing an initial predetermined time delay for said sampling pulse.

7. The pulse measuring system of claim 6 including means for adapting said system for peak detection.

8. The pulse measuring system of claim 2 including initial control voltage setting circuit means for establishing an initial magnitude of said control voltage to said sampling signal generator means and thereby establishing an initial time delay for said sampling pulse.

9. The pulse measuring system of claim 8 including a polarized integrating circuit means connected in bypass across said detecting amplifier circuit means for
(A) sensing the direction of polarity change thereof and
(B) providing an output from said polarized integrating circuit means to the input of said detecting amplifier circuit means when the direction of polarity change is opposite to a predetermined change in polarity whereby the output of said detecting amplifier circuit means is
   (a) maintained constant against response to one polarity change in amplitudes of said waveform and
   (b) responsive to the opposite polarity changes in amplitudes of said waveform.

10. A pulse measuring system for measuring the time characteristics of a waveform comprising:
(A) means for generating a time-variable sharp-spiked sampling signals including
   (a) means for controllably delaying said sampling signal a predetermined amount in response to and proportional to an applied control potential;
(B) a tunnel diode;
(C) means for applying said waveform to said tunnel diode;
(D) a source of selectively variable reference potentials representing a desired magnitude along said waveform;
(E) means for biasing said tunnel diode in response to a selected reference potential including
   (a) means for superimposing said time-variable sampling signal to provide a composite signal for control of said tunnel diode to its operating state;
(F) a detecting circuit means responsive to the operating state of said diode for providing an output control voltage;
(G) means connecting said output control voltage to said sampling signal generator as said control potential therefor, whereby said sampling signal delay is varied until the peak of said composite signal coincides about the threshold value of said tunnel diode; and
(H) indicating means in said connecting means for representing an output proportional to the delay of said sampling signal coincident with said waveform at said threshold level.

11. A pulse measuring system for measuring the time characteristics of a waveform comprising:
(A) a source of control signals;
(B) means responsive to said control signals for generating a time-variable sharp-spiked sampling signal including
   (a) means for controllably delaying said sampling signal a predetermined amount in response to and proportional to an applied control potential;
(C) a tunnel diode;
(D) means for applying said waveform to a terminal of said tunnel diode;
(E) a source of selectively variable reference potentials representing a desired magnitude along said waveform;
(F) means for biasing said tunnel diode in response to a selected reference potential including
   (a) means for superimposing said time variable sampling signal to provide a composite signal for control of said tunnel diode to its operating state;
(G) a detecting amplifier responsive to the operating state of said diode for providing an output control voltage;
(H) means connecting said output control voltage to said sampling signal generator as said control potential therefor, whereby said sampling signal delay is varied until the peak of said composite signal coincides about the threshold value of said diode; and
(I) indicating means in said connecting means for representing an output proportional to the delay of said sampling signal coincident with said waveform at said threshold level.

12. A pulse measuring system for measuring the voltage levels and time characteristics of a waveform comprising:
(A) means for generating a sharp-spiked time variable sampling signal;
(B) means for controllably delaying said sampling signal in response to and in proportion to a variable source of control voltages;
(C) a tunnel diode;
(D) means biasing said tunnel diode including
   (a) means for superimposing said sampling signal on said waveform for control of said tunnel diode to its operating state;
(E) a source of reference voltages;
(F) amplifier detecting circuit means responsive to the operating state of said diode for providing an output control voltage;
(G) switching means including
   (a) a first means for selectively connecting the output of said amplifier circuit means between either one of (i) said bias means for varying the bias of said tunnel diode to establish a threshold level therefor, and (ii) said control means as said source of control voltages therefor, and (b) a second means for selectively connecting said source of reference voltages between either one of (i) said bias means for establishing a threshold level along a predetermined portion of said waveform and (ii) said control means as said source of control voltage therefor; and (H) indicating means responsive to said output control voltage for selectively (a) representing an output proportional to the amplitude of said waveform coincident with said sampling signal, and (b) representing an output proportional to the delay of said sampling signal coincident with said waveform at said threshold level.

References Cited

UNITED STATES PATENTS

| | | |
|---|---|---|
| 2,517,977 | 8/1950 | Cole et al. |
| 3,121,199 | 2/1964 | Harrison _____ 330—107 X |
| 3,378,785 | 4/1968 | Nordahl _____ 330—107 |
| 3,286,180 | 11/1966 | Hubbs. |
| 3,437,927 | 4/1969 | Cornwell et al. ____ 324—103 X |

RUDOLPH V. ROLINEC, Primary Examiner

E. F. KARLSEN, Assistant Examiner

U.S. Cl. X.R.

324—68, 102, 103